(12) United States Patent
Cambon et al.

(10) Patent No.: US 6,675,129 B1
(45) Date of Patent: Jan. 6, 2004

(54) INTERNET BASED SUPPLIER PROCESS RELIABILITY SYSTEM

(75) Inventors: Alexander Carswell Cambon, Louisville, KY (US); William Joseph Wunderlin, Louisville, KY (US); Todd Mark Heydt, Crestwood, KY (US); Douglas Charles Kemp, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 268 days.

(21) Appl. No.: 09/749,506

(22) Filed: Dec. 28, 2000

(51) Int. Cl.[7] ................................................ G06F 19/00
(52) U.S. Cl. ........................ 702/182; 702/84; 700/109
(58) Field of Search ........................ 700/99, 101, 106, 700/108, 109; 702/81, 82, 83, 84, 182; 705/1, 7

(56) References Cited

U.S. PATENT DOCUMENTS

| | | | |
|---|---|---|---|
| 5,408,405 A | 4/1995 | Mozumder et al. | |
| 5,659,478 A | 8/1997 | Pennisi et al. | |
| 5,687,077 A | 11/1997 | Gough, Jr. | |
| 5,742,511 A | 4/1998 | Chassé et al. | |
| 5,787,021 A | 7/1998 | Samaha | |
| 5,949,678 A | 9/1999 | Wold et al. | |
| 6,061,640 A | 5/2000 | Tanaka et al. | |
| 6,249,712 B1 | 6/2001 | Boiquaye | |
| 6,345,239 B1 | 2/2002 | Bowman-Amuah | |
| 2002/0072953 A1 * | 6/2002 | Michlowitz et al. | 705/10 |
| 2002/0077715 A1 * | 6/2002 | Haraburda et al. | 700/97 |
| 2002/0077717 A1 * | 6/2002 | Harburda et al. | 700/99 |
| 2002/0077718 A1 * | 6/2002 | Harburda et al. | 700/106 |
| 2002/0082736 A1 * | 6/2002 | Lech et al. | 700/108 |
| 2002/0087372 A1 * | 7/2002 | Maresca et al. | 705/7 |
| 2002/0113792 A1 * | 8/2002 | Pena-Nieves et al. | 345/440 |

* cited by examiner

Primary Examiner—Patrick Assouad
(74) Attorney, Agent, or Firm—George L. Rideout, Jr., Esq.; Armstrong Teasdale LLP

(57) ABSTRACT

The present invention provides a system by which the host can receive an ongoing reliability audit of a component supplier's production test results over the Internet. This invention analyses and graphs the test results to determine component reliability and to detect changes in reliability over time. One parameter used to detect these changes is mean time between failure (MTBF). This invention uses statistical analysis to determine the reliability status and to detect changes in reliability.

23 Claims, 13 Drawing Sheets

INTERNET BASED SUPPLIER PROCESS RELIABILITY SYSTEM

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights.

BACKGROUND OF THE INVENTION

The present invention relates generally to a supplier quality review process and more specifically to an Internet based reliability goods monitoring process.

Manufacturer supplier quality has long been an important aspect of manufacturer product quality. The importance of supplier quality and reliability has increased in recent years as the margin for unacceptable supplied goods has decreased. Historically, manufacturers, to whom suppliers provide parts, determine supplier quality after the goods have been received, long after the parts leave the supplier premises. Only after conducting incoming inspection or having the goods rejected in the normal production process does the manufacturer know of the level of quality of the supplier goods.

Reliability methodologies exist which enable a manufacturer to determine the level of supplier quality. Methods such as parts reliability status and mean time between failure (MTBF) estimates have been historically used in goods quality evaluation. Exponential reliability is one mathematical model by which changes in reliability may be determined. If the probability of failure during the useful life is approximately random then it is said to have an exponential distribution. Parts that exhibit random failures are thus particularly suited for the exponential reliability failure rate prediction equation. Other failure rate prediction functions including the Weibull, lognormal, normal, gamma, and other distributions. These functions may be used to estimate reliability and to determine changes in reliability.

It would be desirable to have a system that uses the efficiency of the Internet to contemporaneously provide parts reliability information to the receiver before the goods are shipped to the receiver. This gives the manufacturer and supplier the ability to resolve reliability problems quicker. It also gives the manufacturer the ability to reject or re-work the parts before they are used to assemble the finished product.

BRIEF SUMMARY OF THE INVENTION

The present invention is a process for identifying the reliability and shift in reliability of evaluated parts, by capturing test data via the Internet at the supplier's site and setting an Internet communicated alarm in the event that evaluated parts fall outside at least one predetermined acceptable range. In an exemplary embodiment the above identified process comprises the following steps: first, a supplier identification number and related information is communicated to the Supplier Process Quality (SPQ) program residing on a server to authorize the supplier to send data to the host user and set the respective alarm limits; next the respective supplier registers by logging on to the server by providing the associated ID and related information; next, the respective supplier provides measured data relating to the evaluated goods; finally, the SPQ program evaluates the data and alarms when the calculated results of the data fall outside the respective preselected range.

DETAILED DESCRIPTION OF THE INVENTION

The present invention provides a system by which a user who expects to receive goods, also identified as the host company, can receive an ongoing reliability audit of a component supplier's production test results over the Internet. This invention analyzes and graphs the test results to determine component reliability status and to detect changes in reliability over time. Alarms are sent if the reliability does not meet acceptable levels. The reliability audit test is a review of the products the supplier produces for the host-user. The purpose of this test is to assess the ongoing reliability of the products compared to host-user requirements, and to detect changes in reliability during ongoing production. The Supplier Process Quality (SPQ) process uses statistical analysis to determine the reliability status and to detect changes in mean time between failures (MTBF) or other reliability parameters.

Figure 1:
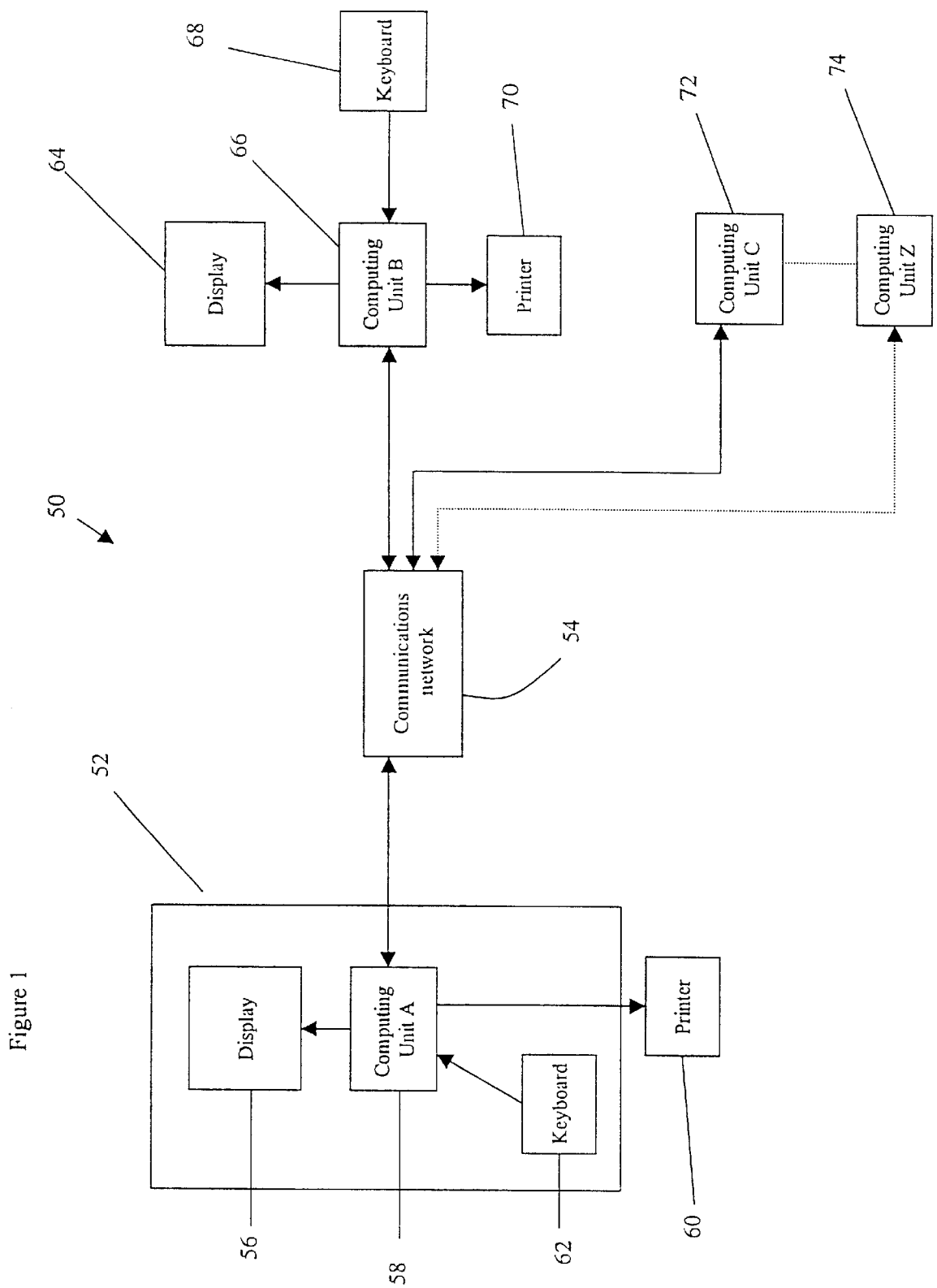
FIG. 1 is a block diagram of the hardware of the present invention.

In one embodiment SPQ system 50 comprises hardware Illustrated in FIG. 1 and has the following components, a communications network 54 comprising Internet ready communications coupled to a computing unit A 58 and a computing unit B 66. Server 52 is typically a Internet based server which interfaces with a plurality of browsers so as to effect Internet communications. In one embodiment, computing unit A 58 and computing unit B 66 communicate using the Transmission Control Protocol/Internet Protocol (TCP/IP). One exemplary server is the Netscape Application Server 4.06™. Computing unit A 58 and computing unit B 66 may comprise a browser, which is used to communicate over communications network 54. One exemplary browser is the MICROSOFT INTERNET EXPLORER 4.0™. Server 52 is adapted to contemporaneously communicate with a plurality of computing units of which computing unit B is but one example. Computing unit A 58 may also comprise a commercially available display 56, keyboard 62 and printer 60. Computing unit B 66 may comprise a commercially available desktop computer having, memory, disk storage means, a keyboard 68, a printer 70, and a display 64. Computing unit A may comprise a commercially available desktop computer having memory and disk storage means. It is understood that communications network 54 may comprise Internet, Intranet, Local Area Network, Ethernet, and other limited communications networks all known in the art.

In an exemplary embodiment server 38 may be accessed by computing unit B 66 by providing a web address having a registered Uniform Resource Locator (URL) hyperlink and by providing an associated password on most commercially available web browsers. Computing unit A 58, houses server software comprising the SPQ system.

In the present invention, generally, a host user may define parameters to set up the reliability audit test using a number of variables including part identification, failure modes, performance criteria and testing parameters. Once the host has defined these variables the supplier can generate reliability test data and enter data to a server accessible by the host user. At the end of a specified test period the data is communicated to the host company via a communications network. The communications network in an exemplary embodiment may be the world wide web. The test data is evaluated against the performance criteria previously entered and alarms are sent when the test criteria is not met. Also, estimates of reliability and MTBF (or other reliability parameters) may be made and status results communicated to the host and others contemporaneously, before the parts are shipped to the user and preferably before the parts are completed by the supplier so that corrective action can be taken during the supplier manufacturing cycle.

Figure 2:
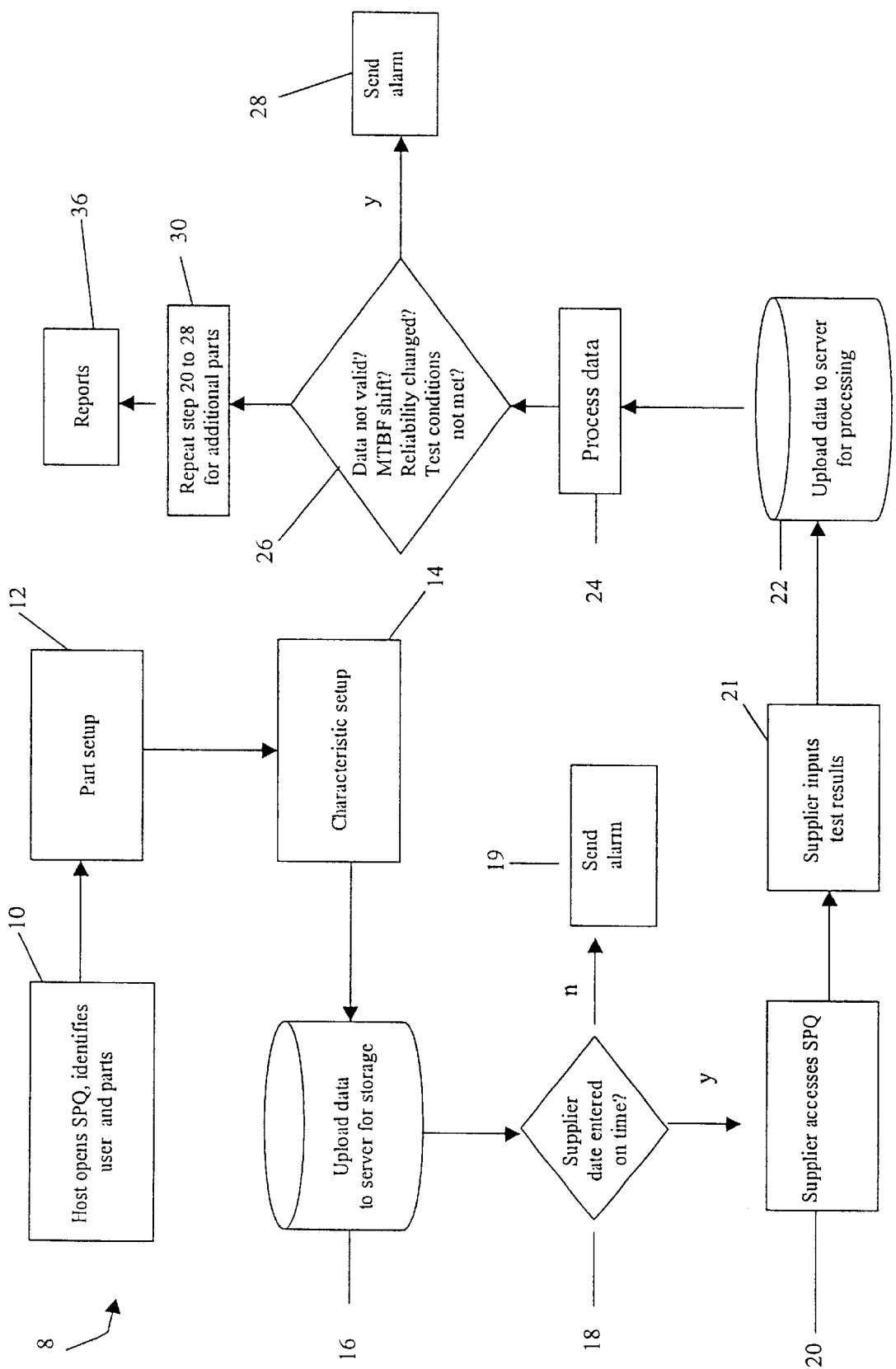
FIG. 2 is a process flow diagram identifying elements of the host process and the supplier process of the present invention.
Figure 3:
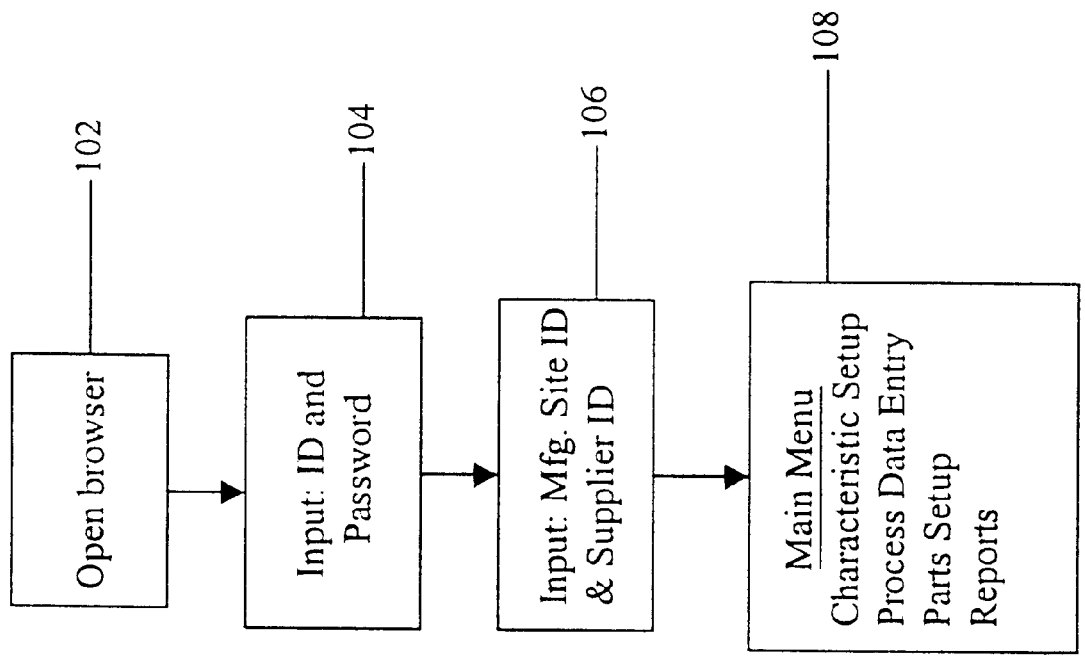
FIGS. 3 is a process flow diagram illustrating the Part Setup process of the SPQ system.

More specifically, the present invention comprises a process by which the quality of goods to be shipped to a manufacturer may be contemporaneously evaluated using world wide web based technology. An exemplary embodiment of such a process is illustrated in FIG. 2. This process illustrates the methodology utilized to evaluate, from a remote site, in near real time, the manufacturing process quality of a supplier by the host, the one to subsequently receive the part or subsystem from the supplier. The SPQ reliability process 8, comprises the following steps:

Step 10. A host user opens SPQ program 10 and inputs alpha-numeric characters that identify the user and the supplier ID.

Step 12. The host user opens PART SET UP menu in SPQ program 10, inputs new part number under NEW PART SET UP submenu and indicates to whom email alarms should be sent at the supplier and manufacturer site.

Step 14. The host user opens CHARACTERISTIC SET UP menu in the SPQ program, chooses, for example, EXPONENTIAL, and enters a test description and AUDIT TEST PARAMETERS (such as the historical MTBF, the reliability goal, the confidence level, the typical number of units on test, the stress level, the number of hours or cycles per test period, and the number of hours or cycles equivalent to one year). It is understood that EXPONENTIAL is the function that enables selection of the exponential failure rate prediction equations. The Weibull, lognormal, or other failure rate prediction equations may alternatively be selected.

Step 16. Server 52 stores and updates the PART SET UP and CHARACTERISTIC SET UP information.

Step 18. The server checks to see if the supplier data were entered on time.

Step 19. If the supplier data were not entered on time, then alarms are sent to the host and to the supplier.

Step 20. The supplier inputs a supplier log-on number to gain access the SPQ program, then the supplier user selects the PROCESS DATA ENTRY menu and selects PART NUMBER submenu and characteristic ID.

Step 21. The supplier user then inputs test data to computing unit B 66.

Step 22. Data is sent to server 52 to be processed.

Step 24 and 26. SPQ exponential program then processes the data to determine if:

a) The data are internally valid, for example, the number of failures should be no greater than the number of test units.

b) An MTBF (or other reliability parameter) shift has occurred, using statistical decision rules.

c) A reliability shift has occurred, using statistical decision rules.

d) Test conditions have been met.

Step 28: If there are concerns with any of these checks, then an alarm is communicated to the host.

Step 30. Steps 20 through 28 are then repeated for additional parts.

Step 36. A REPORT menu may also be entered and a report generated comprising the reliability levels and parameters (such as MTBF) over time. The REPORT menu enables the user to generate data listings, graphical printouts of reliability levels, and a part status report.

Figure 13:
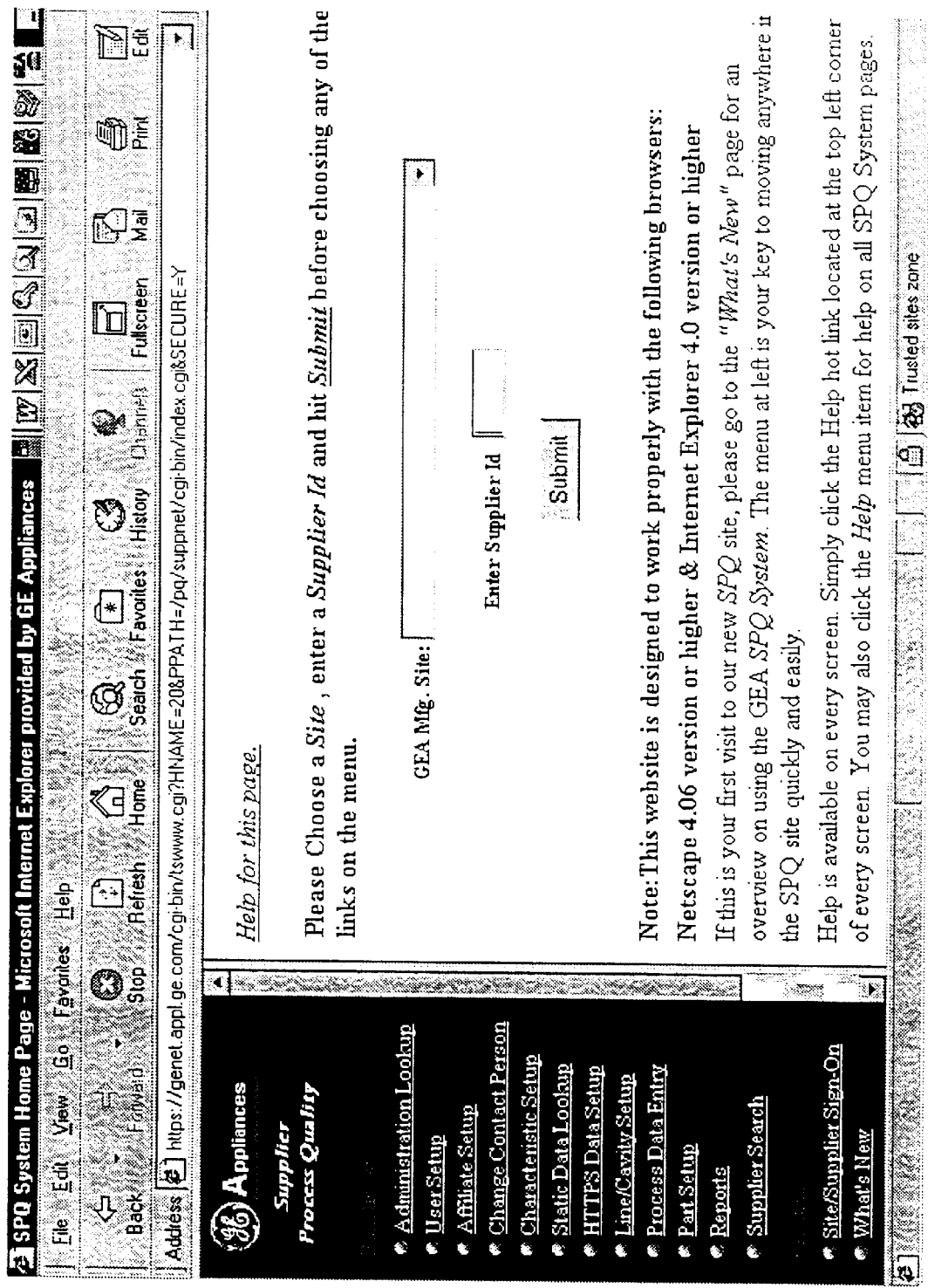
FIG. 13 is a graphical illustration of a chart showing the main menu of the present invention.

FIGS. 3–7, provides further detail of the SPQ process 8 described above. First the server web site is selected using a standard browser as identified above. In one exemplary embodiment the above identified URL may be used to connect to server 52. Step 102. Next the supplier ID and password is entered to get access to server 52. Step 104. Next a menu may be selected from a MAIN menu (FIG. 13) that enables the supplier user to select any one of a number of menus including, PARTS SETUP, CHARACTERISTIC SETUP, PROCESS DATA ENTRY, and REPORTS. Step 108.

Figure 4:
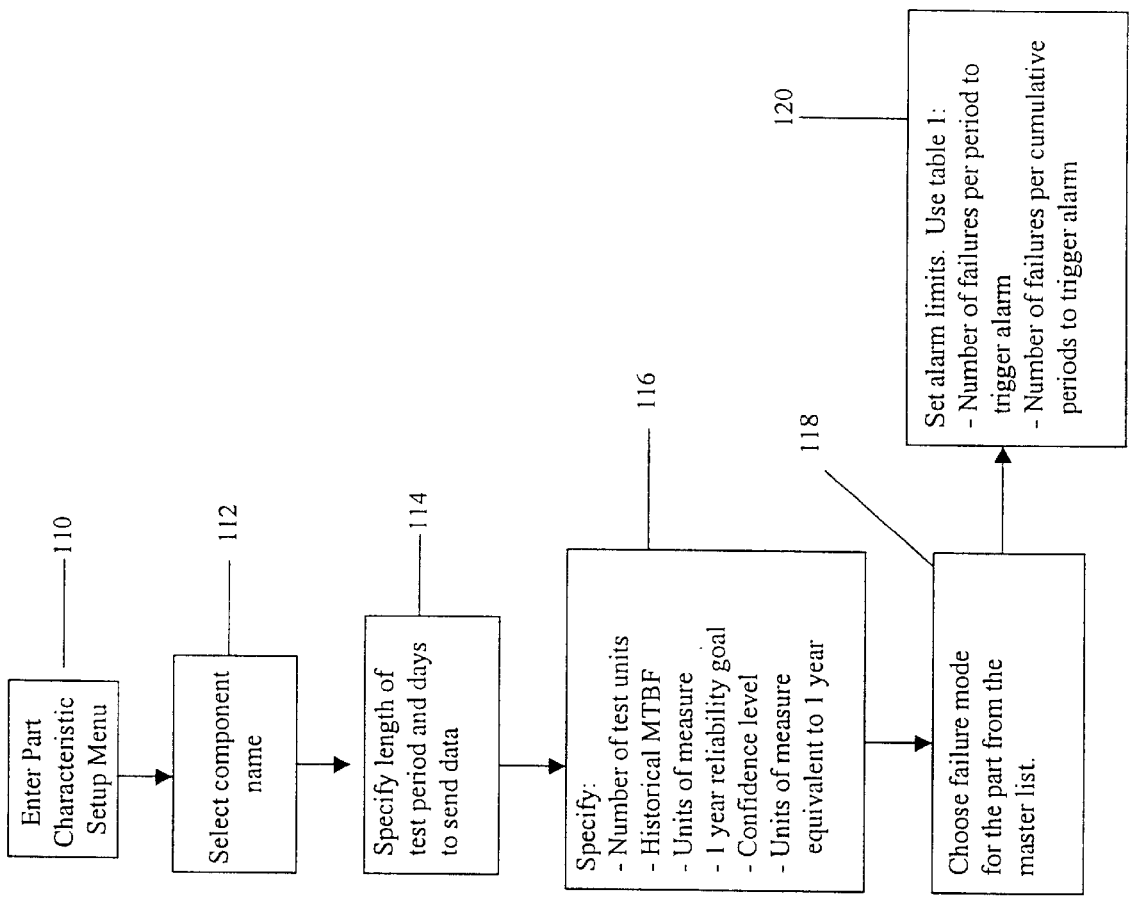
FIG. 4 is a process flow diagram illustrating the Part Characteristic Setup process of the present invention.
Figure 9:
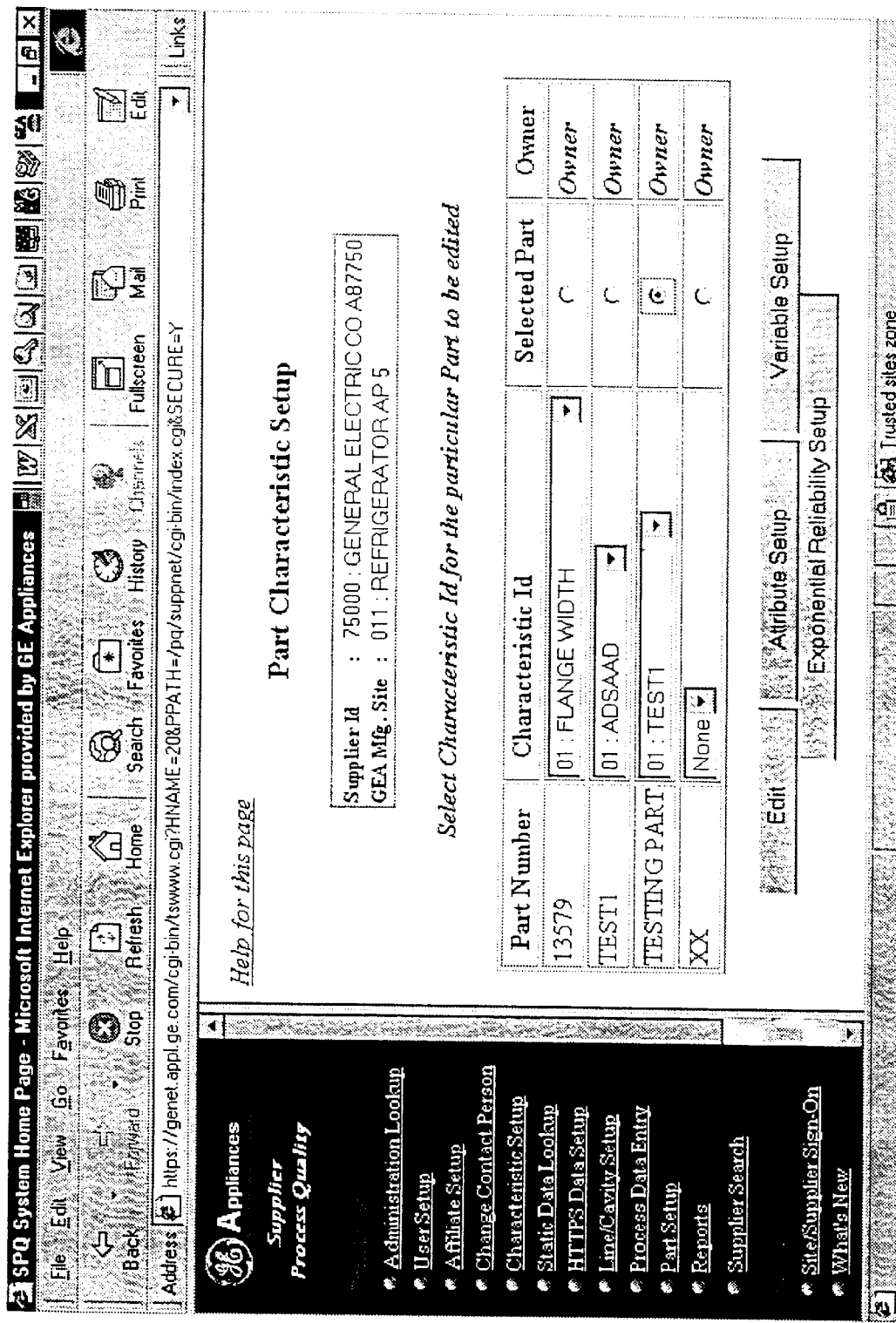
FIG. 9 is a graphical illustration of a chart showing the characteristic setup menu of the present invention.

If the CHARACTERISTIC menu is entered the steps identified in FIG. 4 and FIG. 9 will be utilized beginning with step 110. The host user enters the data in this menu. This data defines the test parameters and alarms for each part ID that can be put under test by a supplier. Once the characteristic menu has been entered the component name is entered by the host user, step 112. Next, the length of the test period is identified along with the limit in the number of days the host company may delay in logging test data, step 114. Next the number of test units, the historical MTBF 155 (FIG. 12), the units of measure (such as hours, cycles, etc.), the one year reliability goal, the confidence level for the one year reliability goal, and the number of units of measure which are equivalent to one year are entered by the host company, step 116. Next, the failure modes are selected for the part from a master list, step 118. Finally, the alarm limits are set, including, the number of failures that will trigger an alarm per test period, and the number of failures that will trigger an alarm for a cumulative number of periods, step 120.

It is understood that the CHARACTERISTIC SETUP menu may comprise a plurality of data input variables including at least one variable selected from the group including: component name, length of test, days to communicate data to host, number of test units, historical MTBF 155, units of measure in one test period, one year reliability goal, confidence level, units of measure equal to one year, failure modes, and alarm limits.

Figure 6:
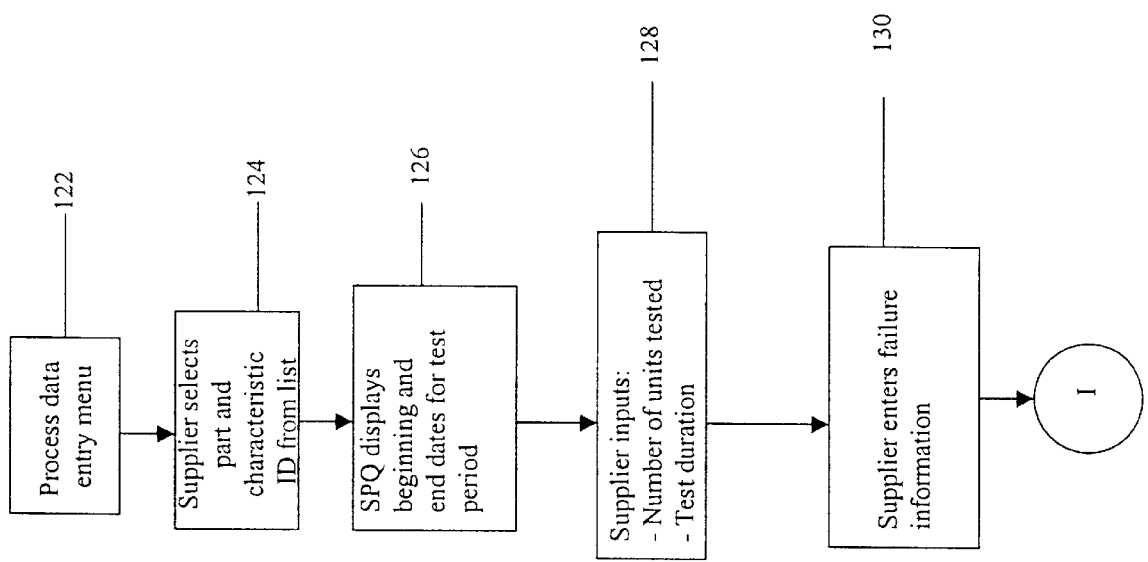
FIGS. 6–7 are process flow diagrams illustrating the Process Data Entry Process of the present invention.
Figure 7:
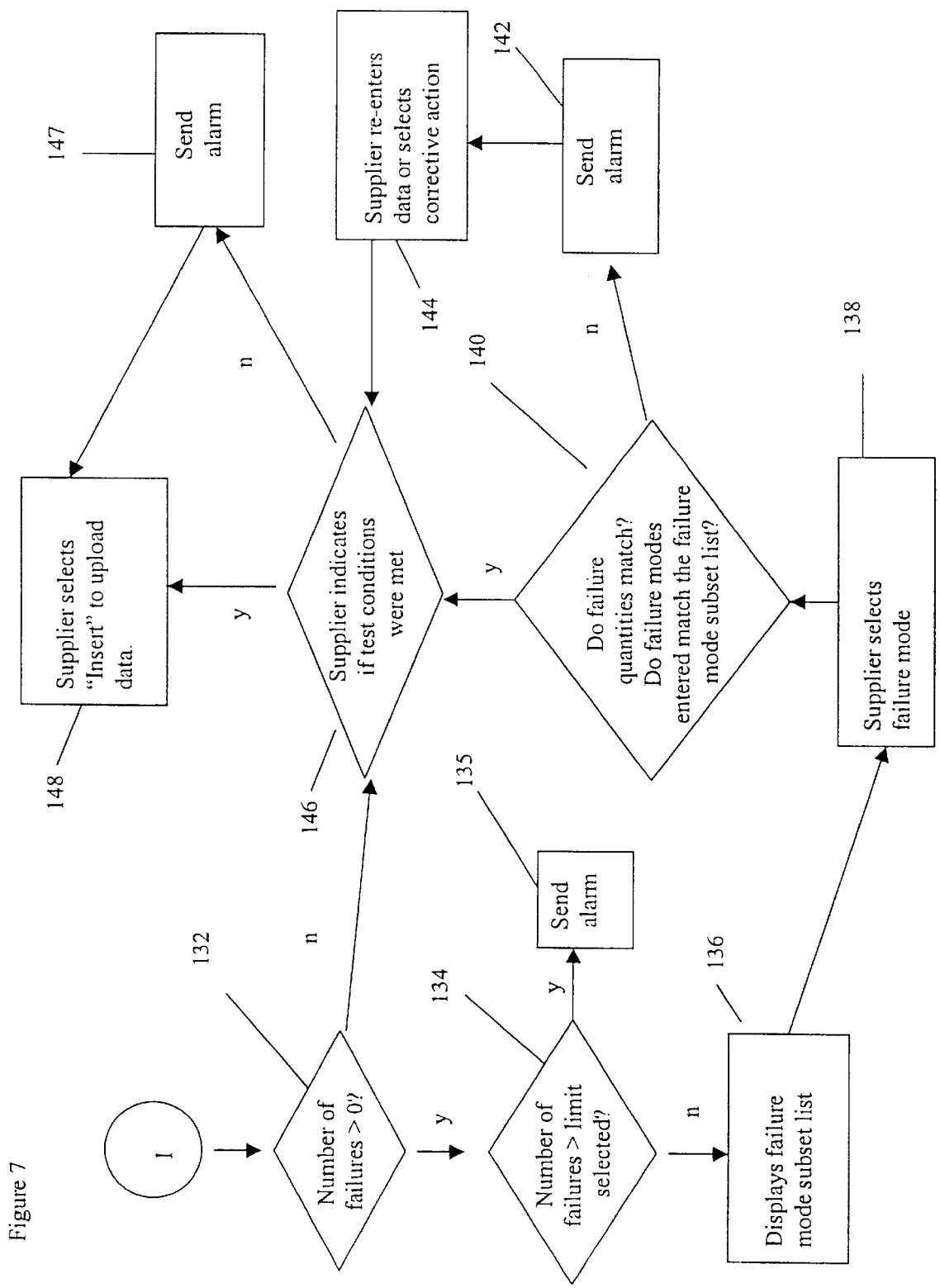
Figure 10:
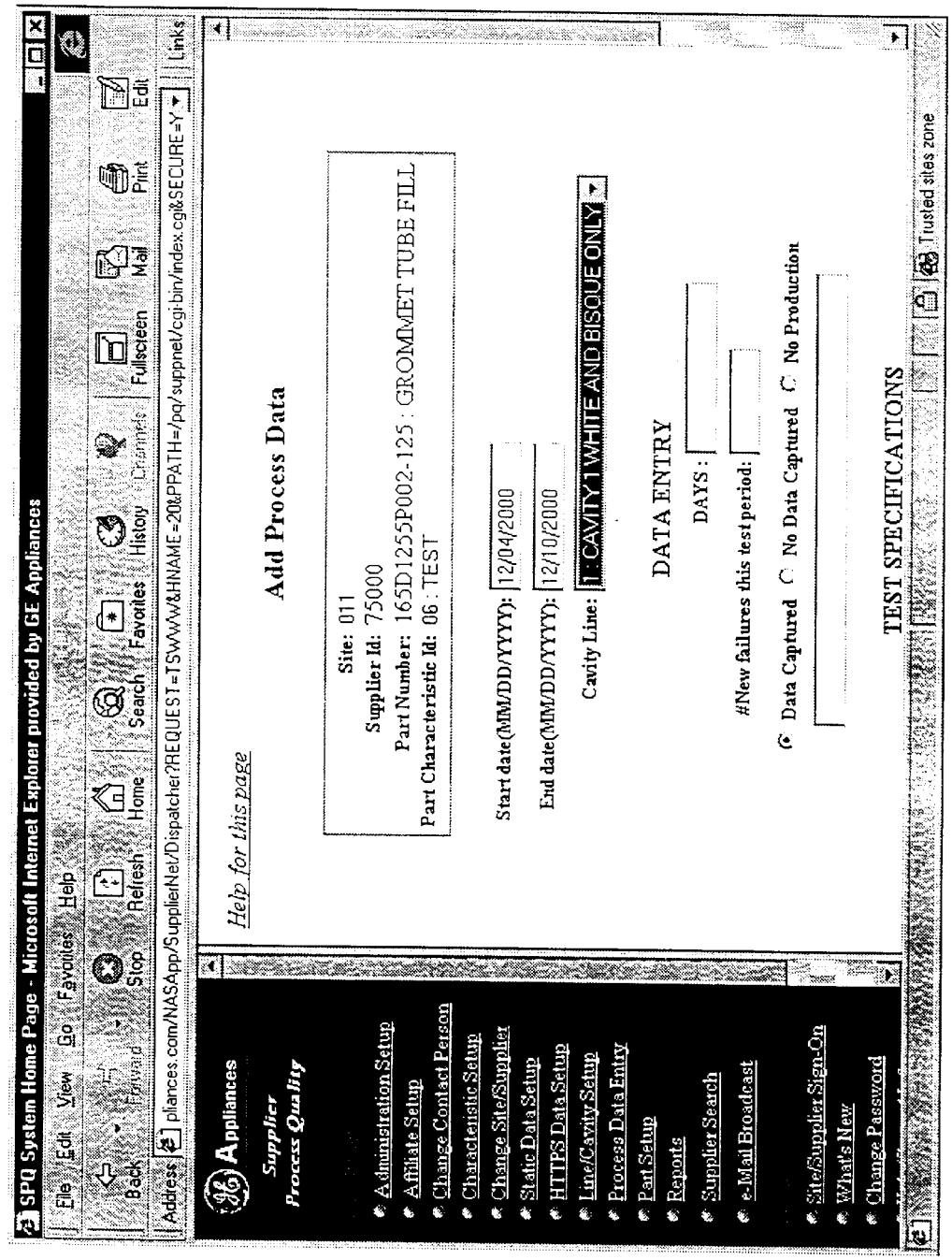
FIG. 10 is a graphical illustration of a chart showing the process data entry menu of the present invention.

If the PROCESS DATA ENTRY menu is entered the steps identified in FIG. 6, FIG. 7, and FIG. 10 are will be utilized beginning with step 122. The supplier user enters the data in this menu. This data is representative of actual test data obtained from units under test for which reliability information is sought. After the process data menu is entered, step 122, the supplier selects the characteristic ID and part from a parts list previously provided as part of the characteristic setup menu, step 124. Next, the SPQ program displays test start and end dates based on the test time previous entered in the characteristic setup menu, step 126. Next, the supplier enters the total number of units under test for a single test period and the test duration (for example, the number of hours, cycles, days), step 128. Finally, the supplier enters the number of new failures encountered during the test period, step 130. If a reliability distribution other than the exponential distribution is used, then SPQ prompts the supplier to enter the following for each test unit: test hours; an indicator telling if the unit has failed; the failure time and failure mode for each failed unit; and an indicator telling if the unit will continue on test into the next test period.

FIG. 7 further describes the PROCESS DATA menu beginning with reference "I". If the number of failures is greater or equal to one, then steps 134 through 144 are performed. If the number of failures is equal to zero, then steps 134 through 144 are skipped. If the number of failures is greater than or equal to the failure limit selected by the host in the characteristic menu, then an alarm is triggered and communicated to the host company, steps 134 and 135. Next the failure mode list for the part selected in the characteristic menu, is displayed, step 136. The supplier selects the failure modes, step 138. If the total of all failure modes entered do not equal the number of failures entered by the supplier in step 130, then an alarm is set and communicated to the host, steps 140 and 142. If a new failure mode is entered an alarm is triggered and communicated to the host company, step 142. Next, the supplier selects the corrective action assessment, including one of a number of items (for example, corrective action entered into supplier FRACAS system, no corrective action needed, or corrective action must be entered into host FRACAS), step 144. Next, the supplier may certify that the test conditions were met, step 146. If the supplier does not certify that the test conditions were met an alarm may be generated and communicated to the host company, step 147. Finally, the supplier selects, "INSERT" to upload the data the server 52, step 148.

It is understood that the PROCESS DATA menu comprises a plurality of data input variables including at least one variable selected from the group including: characteristic ID, part number, units of measure, number of new failures, failure mode, corrective action, and certify test.

Figure 8:
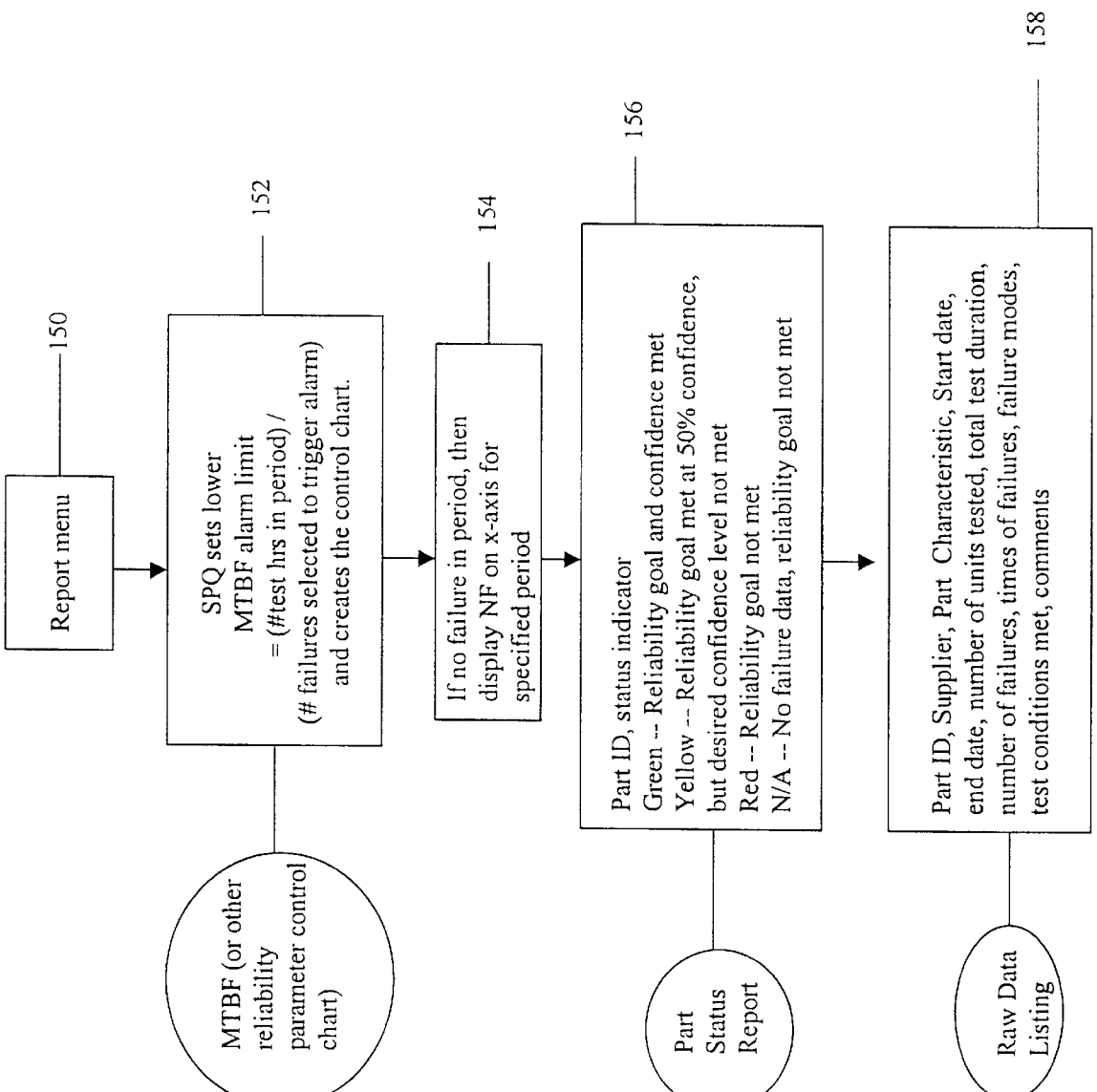
FIG. 8 is a process flow diagram illustrating the Report Process of the present invention.
Figure 11:
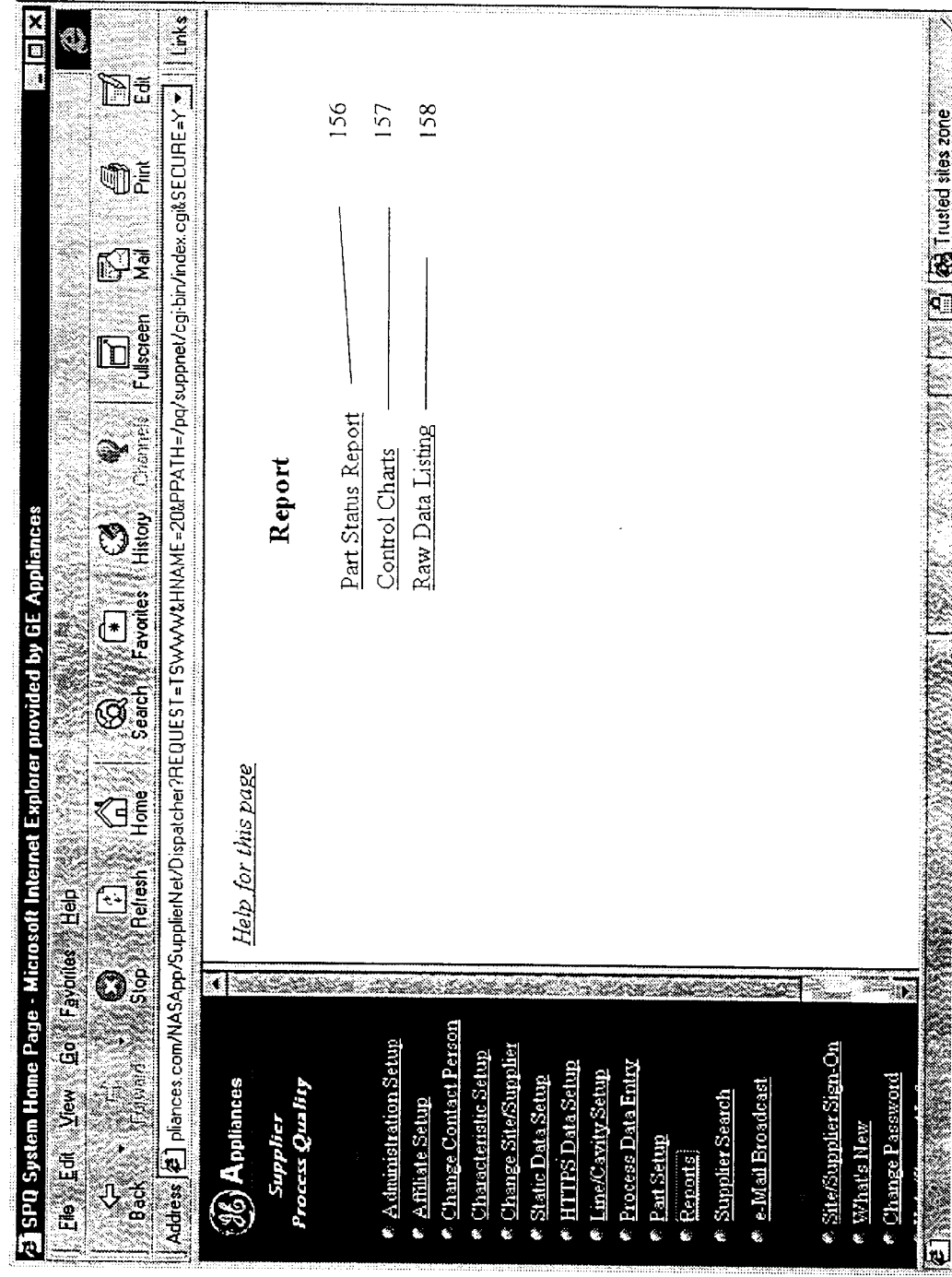
FIG. 11 is a graphical illustration of a chart showing the report menu of the present invention.

If the REPORT menu is selected, the steps in FIG. 8 and FIG. 11 will be utilized to generated one of three reports, including an MTBF (or other reliability parameter) chart, a part status report, and a raw data listing. After the report menu is entered, step 150, three reports may be selected. If the MTBF chart report is selected, the SPQ program 8 sets a lower MTBF alarm limit, step 152, defined by the equation:

Lower alarm limit=(number of test hours in one test period)/(number of failures selected to trigger alarm)

If there are no failures in the period to be reported NF is displayed on the x-axis for the specified test period, step 154.

For reliability distributions with more than one parameter (such as the Weibull or lognormal distributions), a joint (bivariate) confidence region may be plotted. In addition, a scatter plot may be created with one parameter on each axis, and with each point representing the estimates of the two parameters for one time period.

If the part status report is selected the parts ID and a status indicator is shown for each part associated with the supplier. The status indicated reports a green, yellow, red, or N/A flag according to the rules presented below, step 156. The green flag is displayed if the reliability goal and the confidence level targets identified in the characteristic menu are met for the part. The yellow flag is displayed if the reliability goal is met and the confidence level for this goal is less than or equal to the required level but greater than 50 percent. The red flag is set if the reliability goal is not met and a failure exists. A "N/A" flag is set if there were no failures but the reliability goal was not met.

The raw data lists reports includes for example, the part ID, the supplier company name, the part number, the characteristic that is being evaluated, the test start date, the test end date, the number of units tested, the total test duration (total number of hours, cycles, etc.), the number of failures, the times of the failures, the failure modes, and if the test conditions were met, step 158.

It is understood that the REPORT menu comprises a plurality of reports selected from the group including: an control (or other reliability parameter) chart 157, a parts status chart 156, and a raw data listing chart 158.

Figure 5:
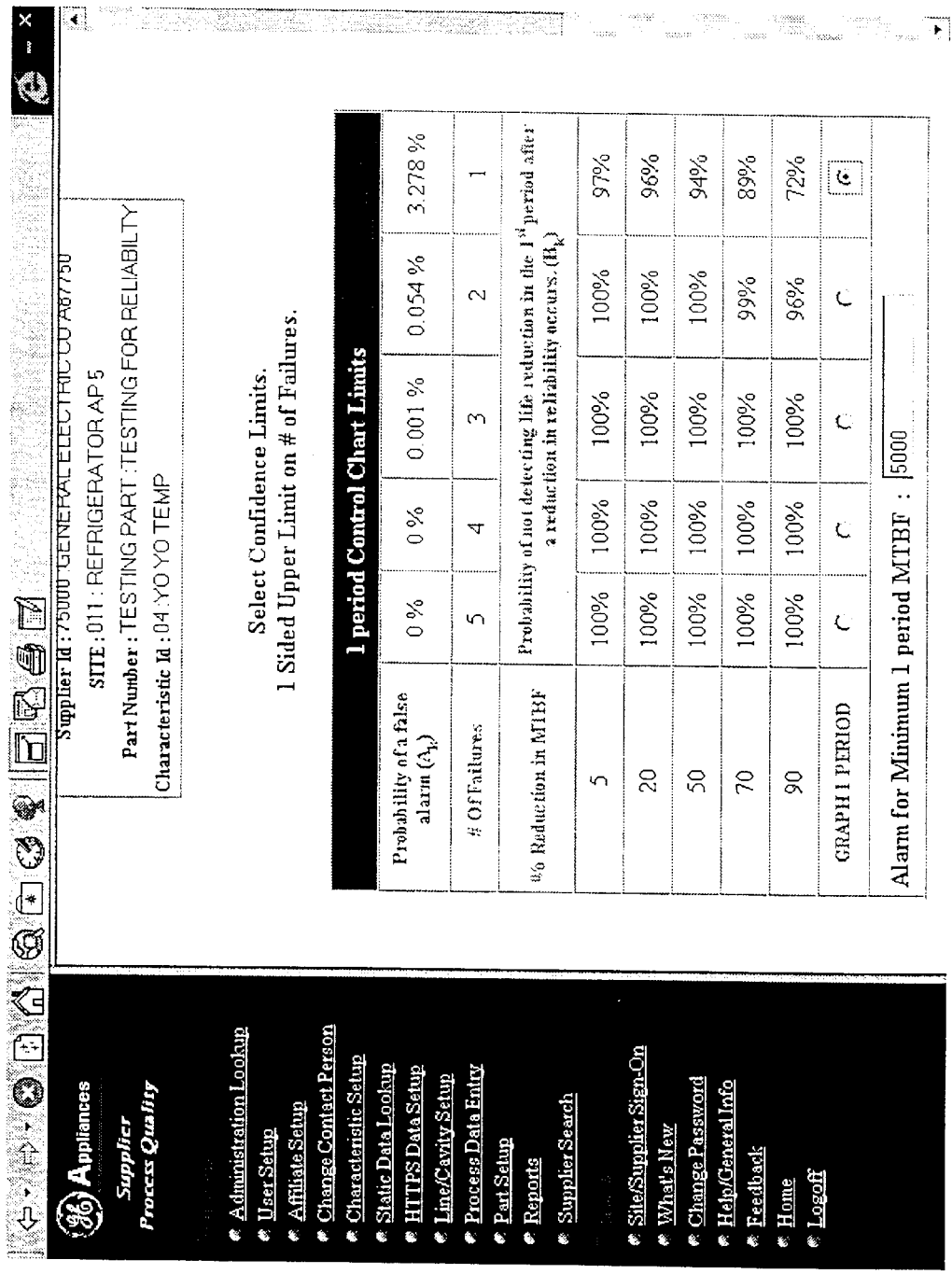
FIG. 5 is an illustration of a chart showing the probability of generating a false alarm and the probability of not detecting a reduction in reliability of the present invention.

FIG. 5 illustrates a chart generated by SPQ 8 in the CHARACTERISTIC SETUP menu that helps the host user to select the number of failures that are acceptable for a the reliability testing of a given part. This chart identifies the probability ($A_k$) of a triggering a false alarm given a predetermined number of failures "K". It also calculates the probability ($B_k$) of not detecting a reduction in a reliability parameter such as MTBF given the above identified number of failures and various magnitudes of shift in reliability. The $A_k$ relates to a statistical Alpha risk, and $B_k$ relates to a statistical Beta risk.

This screen is only displayed if the user previously provided a value for historical MTBF 155, step 116 of FIG. 4, because the calculations for the K's are based on the historical MTBF 155. The user selects the alarm trigger "K" for one test period and for the cumulative test period previously chosen.

SPQ 8 provides the user with a choice of multiple alarm set points, also identified in this specification as K's. In this example 5 alarm set points are defined using the variable K. The median alarm set-point is defined as $K_0$. The algorithm for calculating $K_0$ is Expected failures=test duration/$MTBF$ $K_1$=expected failures+[2.5*square root(expected failures)}]

$K_2$=($K_1$) rounded to the next highest integer $K_0$=max(3, $K_2$)

$K_0$ is the median value of the five alarm set points $K_1$ and $K_2$ are intermediate variables used in calculating $K_0$ Another algorithm calculates the step size between the alarm set-points to determine two higher set-points and two lower set-points on each side of the medial alarm set-point, $K_0$. The algorithm for step size is given as $S_1$={square root($K_0$/4)} truncated to the nearest integer Step size=Max($S_1$, 1), where $S_1$ is an intermediate variable used to calculate step size. For each of the 5 alarm set-points SPQ process 8 is adapted to display $A_k$, the probability of a false alarm, and $B_k$, the probability of not detecting a given percent reduction in MTBF in the period immediately following the reduction. The formula for $A_k$ is given as:

$$A_k = 1 - \sum_{i=0}^{K-1} [\{e^{-(Ta/MTBF)}\}\{(Ta/MTBF)^i/i!\}]$$

Where $T_H$ is the total number of units of measure during the period, and "K" is the number of failures to trigger an alarm.

The formula for $B_k$, the probability of not detecting a reduction in MTBF, is given as $$B_k = \sum_{i=0}^{K-1} [\{e^{-(Ta/MTBF*p)}\}*\{(Ta/MTBF*p)^i/i!\}]$$

Where, in addition to the above defined variables "p" equals (1−(the percent reduction in MTBF/100)). A source where the above identified equations may be reviewed is found in the book entitled, *Introduction to Statistical Quality Control*, Montgomery, 1985, Wiley, p. 45, herein incorporated by reference.

The MTBF and reliability shift calculations described above are based on exponential failure rate equations, however, these calculations may also have been based on equation types selected from the group comprising the Weibull failure rate prediction equation and the lognormal failure rate prediction equation.

Figure 12:
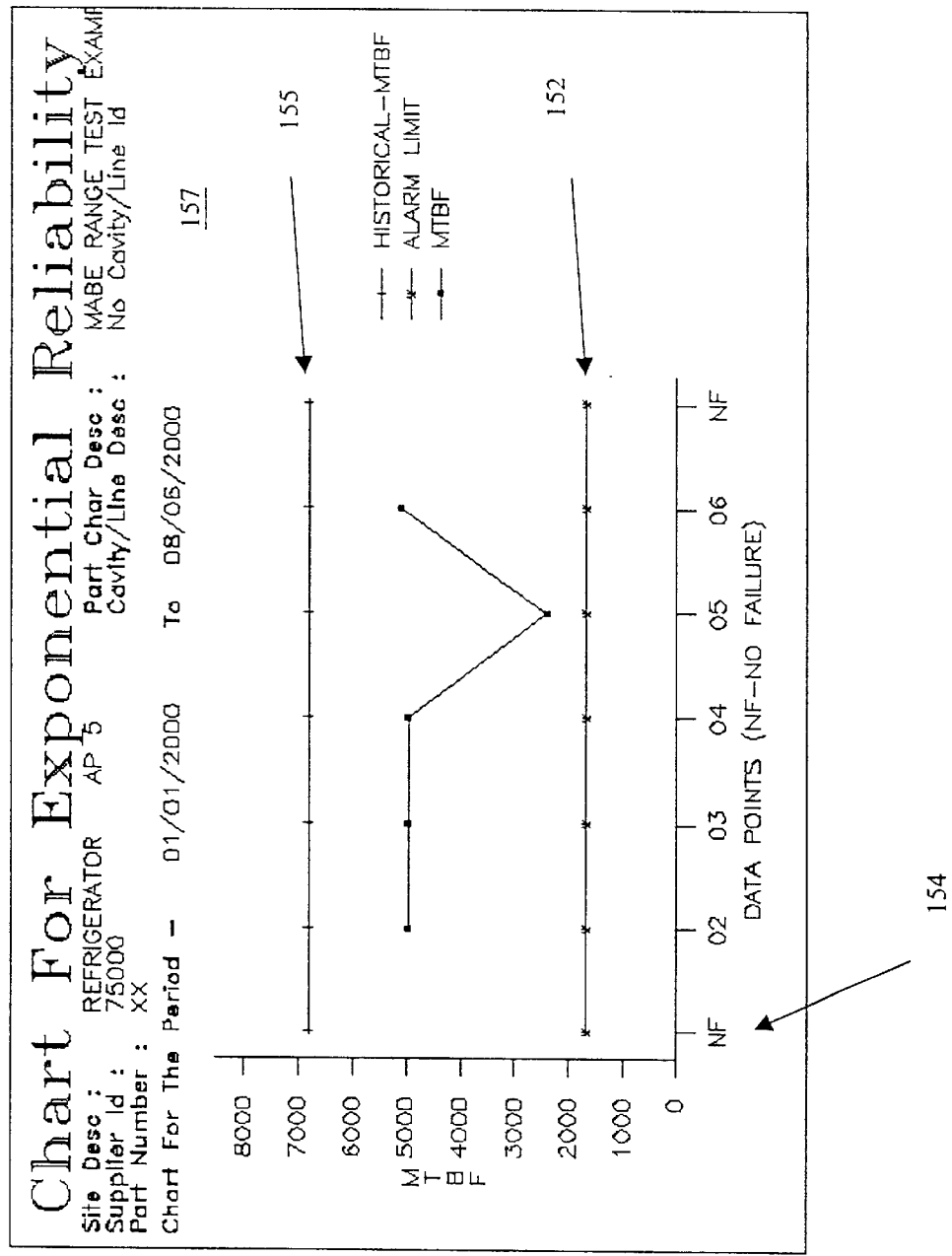
FIG. 12 is a graphical illustration of a plot the MTBF of units under test measured during various testing periods of the present invention.

The present invention provides a system by which the host-company can receive an ongoing reliability audit of a component supplier's production test results over the Internet. This invention analyses and graphs the test results to determine component reliability and to detect changes in reliability over time. One parameter that may be used to detect these changes is mean time between failure (MTBF). FIG. 12, illustrates a typical graph of measured MTBF verses the data points taken for a component test having been conducted over a period of about two months. SPQ uses statistical analysis to determine the reliability status and to detect changes in MTBF, or other reliability parameters. Additionally SPQ system 8 may comprise a computer program storage medium readable by a computer system and encoding a computer program of instructions for executing a computer process for managing the above described SPQ system.

It will be apparent to those skilled in the art that while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A goods reliability evaluation process comprising the following steps:
   at least one host generating information establishing a manufacturer reference site number and at least one supplier reference number for at least one good to be received by said host;
   at least one supplier, after conducting reliability tests on at least one good in an least one test period, logs on to a supplier process quality (SPQ) web site and inputs test and failure data;
   reliability calculations are then completed to determine the quality of at least one good, wherein said test results automatically generate at least one alarm when predetermined test parameters have been breached.

2. The goods reliability evaluation process as recited in claim 1, wherein the reliability calculations utilize failure rate prediction equations and statistical decision rules to determine if a shift in the mean time between failures (MTBF), has occurred in at least one good.

3. The goods reliability evaluation process as recited in claim 2, wherein at least one alarm is generated when a shift in a predetermined reliability parameter has occurred greater than a predetermined value.

4. The goods reliability evaluation process as recited in claim 3, wherein a report may be generated charting said reliability parameter estimates over at least one test period.

5. The goods reliability evaluation process as recited in claim 2, wherein the reliability calculations utilize failure rate prediction equations and statistical decision rules to determine if a change in reliability level has occurred from a predicted reliability level.

6. The goods reliability evaluation process as recited in claim 5, wherein at least one alarm is generated when an reliability level change has occurred greater than a predetermined value.

7. The goods reliability evaluation process as recited in claim 5, wherein a report may be generated charting the reliability level over at least one test period.

8. The goods reliability evaluation process as recited in claim 3, wherein said predetermined alarms are established by calculating a median alarm value and an alarm step size, from which four alarm levels are determined on either side of the median alarm value.

9. The goods reliability evaluation process as recited in claim 8, wherein said five alarm levels are utilized to calculate the probability of false alarm ($A_k$) for each alarm level.

10. The goods reliability evaluation process as recited in claim 9, wherein said five alarm limits are utilized to calculate the probability ($B_k$) of not detecting a life reduction in the first period after a reduction in reliability occurs for each alarm level.

11. The goods reliability evaluation process as recited in claim 10, where a predetermined alarm limit is selected based on said $A_k$, said $B_k$ and said five alarm levels by the host.

12. The goods reliability evaluation process as recited in claim 3, wherein a report may be generated listing the reliability status, comprising at least one reliability status flag indicative of the reliability status.

13. The goods reliability evaluation process as recited in claim 1, further comprising the step of calculating the shift in reliability level based on an equation selected from the group comprising the exponential failure rate prediction equation, Weibull failure rate prediction equation, and the lognormal failure rate prediction equation.

14. A control system having a communications link, said control system comprising:
   at least one server computing unit comprising a supplier process quality (SPQ) program and being coupled to the communications link, wherein said SPQ program comprises a main menu, wherein said main menu is further adapted to enable a user to select at least one of the submenus selected from the group including a characteristic setup menu, a parts setup menu, a process data entry menu, and a report menu; and
   at least one supplier computing unit being coupled to the communications link for communicating with said at least one server computing unit;

wherein the SPQ program is adapted to calculate a shift in reliability and the reliability level based on test data provided to the SPQ.

15. The control system as recited in claim 14, wherein said characteristic menu further comprises a plurality of data input variables including at least one variable selected from the group including: component name, length of test, days to communicate data to host, number of test units, historical MTBF, units of measure in one test period, one year reliability goal, confidence level, units of measure equal to one year, failure modes, and alarm limits.

16. The control system as recited in claim 14, wherein said process data menu further comprises a plurality of data input variables including at least one variable selected from the group including: characteristic ID, part number, units of measure, number of new failures, failure mode, corrective action, and certify test.

17. The control system as recited in claim 14, wherein said report menu may further comprises a plurality of reports selected from the group including: a chart of reliability parameter(s) plotted over time (such as MTBF), a bivariate confidence region for the estimates of two parameters, a bivariate scatter plot of the estimates of the two parameters, a parts status chart and a raw data listing.

18. The control system as recited in claim 14, wherein said communications link comprises the Internet.

19. The control system as recited in claim 14, wherein said communications link comprises a local area network.

20. An internet based computer program embodied on a computer readable storage medium, said program comprising a code segment that:
   controls at least one server computing unit, said server computing unit having data acquisition means;
   acquires, stores, and displays reliability data from at least one supplier computing unit and at least one host computing unit; and
   determines a shift in reliability and generates an alarm when said reliability data is outside a specified range.

21. The computer program as recited in claim 20, further comprising a code segment that determines the component reliability status of at least one good to be supplied by the respective supplier.

22. The computer program as recited in claim 21, further comprising a code segment that generates an alarm communications signal when said shift in reliability is outside a specified limit.

23. The computer program as recited in claim 21, further comprising a code segment that generates an alarm communications signal when said reliability level is outside a specified limit.

* * * * *